United States Patent [19]
Hughes et al.

[11] 3,973,216
[45] Aug. 3, 1976

[54] LASER WITH A HIGH FREQUENCY RATE OF MODULATION

[75] Inventors: Richard Swart Hughes, China Lake; Nicholas Bottka, Ridgecrest; Peter R. Hammond, China Lake, all of Calif.

[73] Assignee: The United States of America as represented by the Secretary of the Navy, Washington, D.C.

[22] Filed: Apr. 28, 1975

[21] Appl. No.: 572,589

[52] U.S. Cl. .................... 331/94.5 M; 350/160 R
[51] Int. Cl.² ........................................ H01S 3/10
[58] Field of Search.................... 331/94.5; 330/4.3; 350/160

[56] References Cited
UNITED STATES PATENTS

| | | | |
|---|---|---|---|
| 3,842,372 | 10/1974 | Pao et al. | 350/160 R |
| 3,854,795 | 12/1974 | Honda | 350/160 R |

*Primary Examiner*—William L. Sikes
*Attorney, Agent, or Firm*—R. S. Sciascia; Miller Roy; Robert W. Adams

[57] ABSTRACT

A dye laser having a high frequency rate of modulation wherein a Franz-Keldysh filter is in the laser cavity to quench Q, and thereby provide modulation. The filter has an absorption edge that shifts in response to an applied electric field, thereby, modulating the laser beam.

9 Claims, 4 Drawing Figures

LASER WITH A HIGH FREQUENCY RATE OF MODULATION

BACKGROUND OF THE INVENTION

In the field of lasers, the output developed by a typical laser device is a continuous beam. The present invention is a technique and apparatus for modulating the output beam. Most modulation techniques operate on the beam outside the laser cavity. Such systems are extremely inefficient, or have other disadvantages. The present invention operates on the beam within the laser cavity, and thereby overcomes the deficencies of those prior techniques.

There are other prior devices which, like the present invention, are intracavity modulators. Those known include both electro-optic and acousto-optic modulators fed by electric sources. The present invention includes a solid state electro-optic modulator utilizing the Franz-Keldysh effect. Its advantages include simplicity and dependability, and a very high frequency rate of modulation. The frequency rate of modulation is limited only by the physical limitation of the semi-conductor material and the highest frequency that can be imposed on the filter, the latter of which is more limiting. Thus, the operating limitations of the modulator are those imposed by the geometry of coupling the signal into the material.

DESCRIPTION OF A PREFERRED EMBODIMENT

Figure 1:
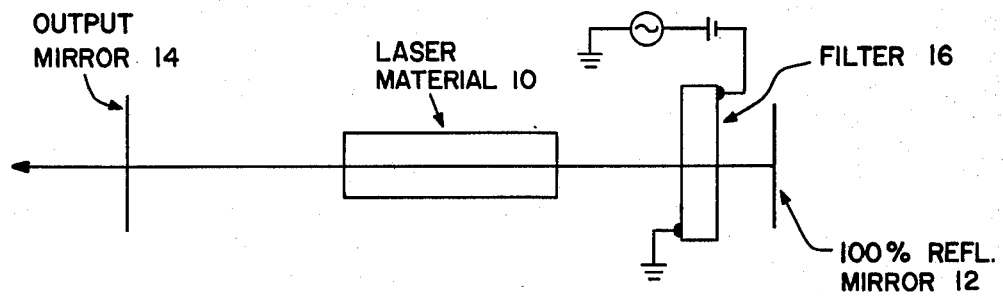
FIG. 1 is a plan view of the preferred embodiment of the present invention.

A preferred embodiment of the present invention is shown in FIG. 1. The laser may be any of the known types of tuneable lasers (e.g., continuous wave, organic dye lasers) and includes laser material 10 within a resonant cavity bounded by totally reflective end mirror 12 and partially reflective output mirror 14 through which the output beam of the laser is provided. Solid state filter 16 is included within the resonant cavity as the means by which the laser beam is modulated.

Figure 2:
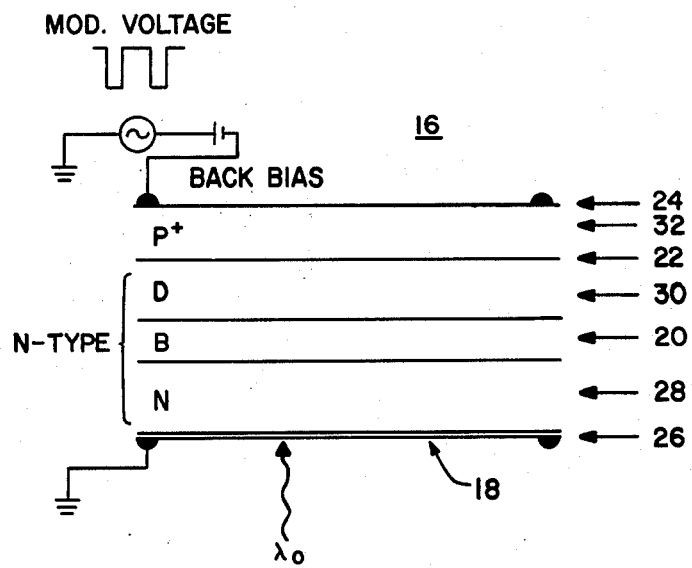
FIG. 2 is a plan view of the preferred embodiment of the solid state filter of the present invention.

A plan view of a double heterojunction structure as an embodiment of filter 16 is shown in FIG. 2 although any other Franz-Keldysh effect-supporting structure may be employed. The semi-conductor filter material has an absorption edge that shifts in response to an applied electric field. Without the applied electric field the emission wavelength of the organic dye laser is tuned so as to be close to the absorption edge of the filter material as shown in FIG. 3A. With an appropriate anti-reflection coating on the filter its transmittance is maximized, thereby permitting high Q resonance of the cavity. As a result, when no electric field is applied to the filter, laser action will be maintained and the present invention will provide a laser beam output.

Figure 3:
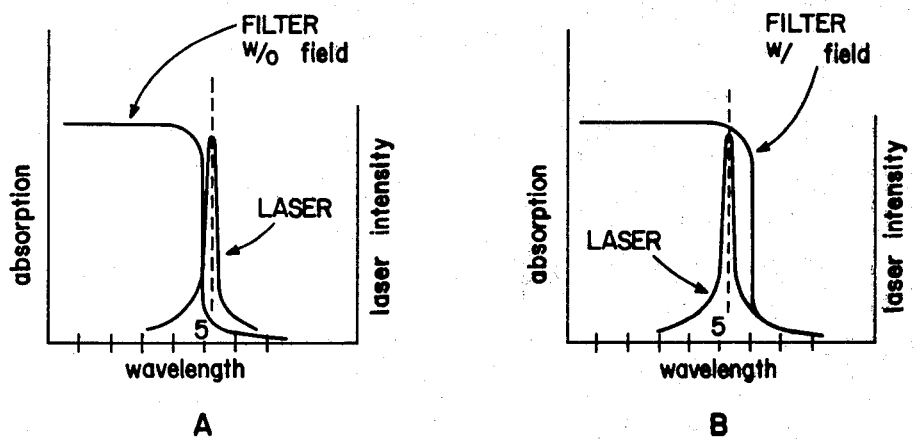
FIG. 3 is a set of graphs showing the shift in the absorption edge of the filter when an electric field is applied and amplitude modulation is achieved.
Figure 4:
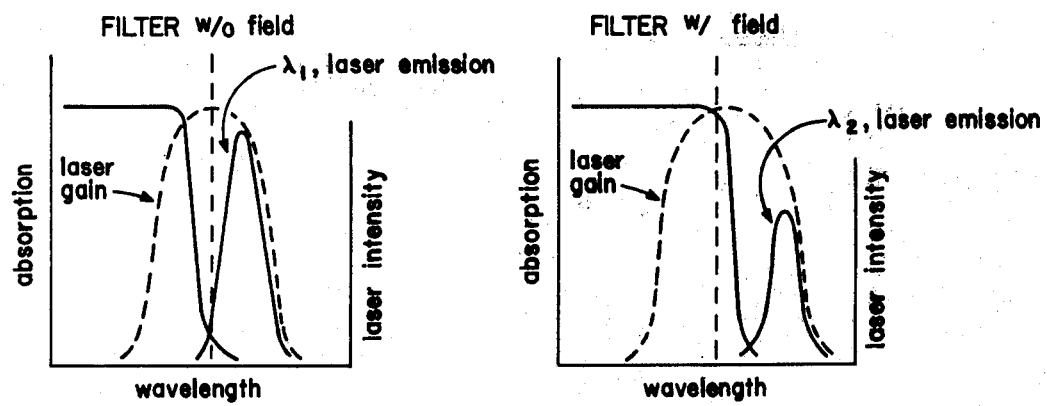
FIG. 4 is a set of graphs showing the shift in the absorption edge of the filter when an electric field is applied and frequency modulation is achieved.

Upon applying an electric field to filter 16, the absorption edge shifts to longer wavelengths according to the Franz-Keldysh principle, and overlaps the laser emission wavelength of the system. If the spectral band width of the laser is narrow compared to the shift of the absorption edge, as shown in FIG. 3, transmission of the emission will be blocked and a very low Q resonant cavity will be produced. Hence, laser action is quenched. That is, amplitude modulation is achieved. On the other hand, if the bandwidth is broad compared to the shift in the absorption edge, as shown in FIG. 4, the wavelength of maximum net gain for laser action is displaced according to the applied electric field across the filter. That is, frequency modulation is achieved. This is shown in FIG. 4 by the shift of laser emission from $\lambda_1$ to $\lambda_2$ when field is applied. The structure of the filter is equally applicable to both frequency modulation and amplitude modulation although optimum design for a specific application may include some variation or modification to that shown. The primary difference between the two as disclosed is in the laser itself. With a narrow spectral bandwidth beam AM is achieved, whereas with a broader spectral bandwidth beam FM is achieved.

FIG. 2 shows the filter geometry of a double heterojunction structure as an embodiment of filter 16. The beam entrance window may be covered with anti-reflectance coating 18, and is a wide gap material substrate which transmits all incident radiation wavelengths ($\lambda_0$) that are longer than its band gap. Buffer zone 20 serves as a lattice match between the substrate material and the subsequent ternary alloys. The substrate material may, for example, be an appropriate binary compound.

Active region 22 consists of an abrupt p-n junction and is of such alloy composition that its absorption edge lies at a wavelength just below the wavelength of the incident radiation $\lambda_0$. In the present invention where the resonant cavity is bounded by a separate totally reflective mirror, electrode 24 will be transparent to the incident radiation, or can have a ring configuration, as shown, which will electrically appear to be a solid plate. As an alternative to the embodiment shown in FIG. 1, electrode 24 can be reflective and perform the function of totally reflective end mirror 12 or partially reflective output mirror 14, depending on its placement within the resonant cavity. Electrode 26 is transparent to the incident radiation, or of ring configuration, as shown.

Filter 16 of the present invention may be any structure that will support the Franz-Keldysh effect. As shown, it may be a double heterojunction structure made up of the following layers. Substrate 28 may be GaAs. Buffer zone 20 may be $GaAs_xSb_{1-x}$. Depletion layer 30 may be $GaAs_xSb_{1-x}$. And, $P^+$ material 32 may be $GaAs_ySb_{1-y}$. The filter may be made by known and presently employed semiconductor fabrication techniques.

By applying a reverse bias voltage to p-n junction 22 the high electric field within the depletion region of the p-n junction shifts the absorption edge of the active material toward longer wavelengths, which is the Franz-Keldysh effect. Now, incident radiation $\lambda_0$ will be absorbed. Absorption or transmission by the filter will depend upon the applied modulation voltage. The range of modulation signals that may be used will be determined by the specific embodiment or composition of the filter designed by those who will practice the present invention.

To those skilled in the art it will be obvious upon a study of this disclosure that the present invention permits a variety of modifications and hence can be given embodiments other than particularly illustrated and described herein, without departing from the essential features of the invention and within the scope of the claims annexed hereto.

What is claimed is:

1. In a laser having a resonant cavity providing a laser beam, apparatus for modulating the beam at a high frequency rate, comprising:
    double heterojunction semiconductor structure within said cavity in the path of said beam, capable of supporting the Franz-Keldysh effect of absorption edge shift;
    means for causing said effect to occur in said structure in a predetermined pattern such that said beam is modulated in response to said pattern as it passes said structure.

2. The apparatus of claim 1 wherein the spectral band width of said laser beam is selected to be narrow relative to said absorption edge shift such that said beam is amplitude modulated.

3. The structure of claim 2 wherein said structure includes a plurality of layers of N-type material and a layer of P-type material, the layer of N-type material adjacent said layer of P-type material comprises the depletion region of $GaAs_xSb_{1-x}$, the layer of N-type adjacent said depletion region comprises the buffer zone of $GaAs_wSb_{1-w}$, and said layer of P-type material is comprised of $GaAs_ySb_{1-y}$.

4. The structure of claim 3 wherein said layers of N-type material further include a substrate layer of GaAs adjacent said buffer zone opposite said depletion region.

5. The structure of claim 4 wherein said means includes back biasing means including a modulation source for creating an varying an electric field in said structure to shift said absorption edge such that said beam is predeterminedly modulated.

6. The apparatus of claim 1 wherein the spectral band width of said laser beam is selected to be broad relative to said absorption edge shift such that said beam is frequency modulated.

7. The structure of claim 6 wherein said structure includes a plurality of layers of N-type material and a layer of P-type material, the layer of N-type material adjacent said layer of P-type material comprises the depletion region of $GaAs_xSb_{1-x}$, the layer of N-type adjacent said depletion region comprises the buffer zone of $GaAs_wSb_{1-w}$, and said layer of P-type material is comprised of $GaAs_ySb_{1-y}$.

8. The structure of claim 7 wherein said layers of N-type material further include a substrate layer of GaAs adjacent said buffer zone opposite said depletion region.

9. The structure of claim 8 wherein said means includes back biasing means including a modulation source for creating and varying an electric field in said structure to shift said absorption edge such that said beam is predeterminedly modulated.

* * * * *